United States Patent [19]

De Ruiter et al.

[11] 4,297,264

[45] Oct. 27, 1981

[54] PROCESS FOR PREPARING ALKOXYLATED CROSS LINKING AGENTS BY PREPARING (A) AN AQUEOUS ALKANOLIC ALKOXYLATED AMINO RESIN (B) AZEOTROPIC DISTILLATION AND (C) DISTILLING EXCESS ALCOHOL

[75] Inventors: Robert S. De Ruiter, Downsview; Stamatis M. Kambanis, Toronto, both of Canada

[73] Assignee: Reichhold Limited, Islington, Canada

[21] Appl. No.: 157,174

[22] Filed: Jun. 6, 1980

[30] Foreign Application Priority Data

Jun. 4, 1980 [CA] Canada ................................. 353359

[51] Int. Cl.$^3$ ...................... C08L 61/24; C08G 12/06; C08G 12/12; C08G 12/32
[52] U.S. Cl. ............................... 260/33.4 R; 528/254; 528/256; 528/260; 528/261; 528/262; 528/263; 528/268; 528/269; 528/495; 528/496; 528/501; 528/502
[58] Field of Search .................... 260/33.4 R; 528/254, 528/256, 260-263, 268-269, 502, 501, 495-496

[56] References Cited

U.S. PATENT DOCUMENTS

| | | | |
|---|---|---|---|
| 2,548,416 | 4/1951 | Barsky et al. | 528/254 |
| 2,998,411 | 8/1961 | Housekeeper | 528/254 |
| 3,392,150 | 7/1968 | Groll | 528/256 |
| 4,039,493 | 8/1977 | Schon et al. | 260/33.4 R |
| 4,143,016 | 3/1979 | Honel | 260/29.4 R |
| 4,174,310 | 11/1979 | Hubbard | 528/259 |

OTHER PUBLICATIONS

Derwent 96339x/52, (Dec. 16, 1976), Hoechst, (DS1595-224), "Isobutanol Etherified Melamine Formaldehyde Conprod...".

Derwent Abs. 83534V/48, (Oct. 31, 1974), Honey Kaseikk, (J74040157), "Aminoplast Prep. for Electrode Paint...".

Derwent Abs. 50429V/28, BASF AG (DT 2259-680), Water Sol.... Agents-Obt. by Condensing a Mit melamine & urea With Formd".

*Primary Examiner*—Lewis T. Jacobs
*Assistant Examiner*—Herbert J. Lilling
*Attorney, Agent, or Firm*—Larson and Taylor

[57] ABSTRACT

An improved process for the preparation of alkoxylated formaldehyde-amino compound resins. By using a sequential procedure, and an alkanol of up to 8 carbon atoms it is possible to remove both the water in the aqueous formaldehyde used and the water from the alkoxylation reaction azeotropically. The products of this invention afford resins of better quality, especially in terms of color and clarity, than the products derived from alcoholic formaldehyde solutions.

13 Claims, No Drawings

PROCESS FOR PREPARING ALKOXYLATED CROSS LINKING AGENTS BY PREPARING (A) AN AQUEOUS ALKANOLIC ALKOXYLATED AMINO RESIN (B) AZEOTROPIC DISTILLATION AND (C) DISTILLING EXCESS ALCOHOL

BACKGROUND OF THE INVENTION (a) Field of the Invention

This invention relates to a method for the preparation of low molecular weight alkoxylated amino resins, generally used as cross-linking agents in the preparation of surface coatings and the like.

(b) Description of the Prior Art

At present, there are two routes to the preparation of these alkoxylated resins, which depend on the use of solutions of formaldehyde. In one route, aqueous formaldehyde is used. This presents the twin problems that since water removal from the resin is expensive, it is desirable to use a concentrated formaldehyde solution. But such solutions are relatively unstable and thus are difficult to handle. In a second route, an alcoholic solution of formaldehyde is used. This has the disadvantage that such solutions although far more stable than aqueous ones, are also far more expensive.

Attempts to prepare alkoxylated resins by reaction of the formaldehyde and amino compound with an alcohol have not proven very successful. The presence of the water from the formaldehyde solution hinders the etherification of the methylol groups. This hindering results in a higher than desired level of polymerization. Further, this water has to be removed, generally again by an expensive evaporation procedure involving heat and/or vacuum. The resulting alkoxylated amino resins have impaired properties, such as high viscosity and lowered mineral spirits tolerance, when compared to similar resins prepared from alcoholic formaldehyde solutions.

SUMMARY OF THE INVENTION

We have now discovered a relatively simple method whereby alkoxylated amino resins may be prepared from formaldehyde and an amino-compound, in which an aqueous solution of formaldehyde is used. Further, this method also provides a procedure whereby both the water present in the formaldehyde solution and the water resulting from the alkoxylation reaction can be simply and economically removed.

DESCRIPTION OF THE PREFERRED EMBODIMENTS

Thus this invention provides a process for preparing an alkoxylated amino resin comprising:

(1) preparing an aqueous-alkanolic solution of an alkoxylated amino resin by either:
  (a) converting an aqueous formaldehyde solution into an alcoholic formaldehyde-amino compound concentrate by admixing aqueous formaldehyde, an amino compound, and an alkanol, and removing the water by azeotrope distillation, the alkanol having up to 8 carbon atoms inclusive and
  (b) reacting the thus formed formaldehyde-amino compound concentrate with an amino compound to provide an alkoxylated amino resin;
  or:
  (c) converting an aqueous formaldehyde solution into a formaldehyde-amino compound concentrate by admixing aqueous formaldehyde and an amino compound and removing the water by distillation; and
  (d) reacting the thus formed formaldehyde-amino compound concentrate with an amino compound and an alkanol having up to 8 carbon atoms inclusive to provide an alkoxylated amino resin;

(2) removing the water remaining in the alkoxylated amino resin by azeotropic distillation with the alkanol; and (3) removing excess remaining alkanol by distillation to provide a desired resin solids content.

It is not necessary that these three steps be operated sequentially right through to the resin solution of step (3). It is possible to operate both sub-steps (a) and (c) independantly, and the intermediate product thus obtained can be stored for use later in sub-steps (b) and (d), respectively.

In the operations involving the removal of water by azeotropic distillation with the alkanol, when using an alkanol that forms two phases with water, that is steps 1(a) and (2) it is practical to economise on the amount of alcohol by continuously returning the alkanol phase from the condensate. There are many suitable devices for this purpose, such as the Dean & Stark apparatus. When an alkanol is used that is water imiscible, it becomes more complex continuously to separate the alkanol from the distillate and return it to the reactor. In this case it may be more convenient to perform the alcohol recovery separately. In this case consideration must be given to solution volumes. The underlying requirement is that it is desirable to maintain a reasonable solution concentration if the desired alkoxylated product is to be obtained. It is therefore convenient to use a low volume of alkanol in the reactor and to replace alkanol as it is removed in the azeotope from the reactor. It appears to be undesirable to add a large enough volume of water uniscible alkanol initially to provide sufficient for azeotope removal, plus a further amount for solution concentration adjustments.

The choice of alkanol which can be used in this process is largely determined by the properties desired in the alkoxylated product. For oil based coatings, generally n-butanol, pentanol, hexanol or a higher alcohol is used. For water based coatings, urethanol generally is used. This process also provides the possibility of using a mixture of alkanols either to get specific properties, or to reduce costs by using lower quality products, for example the mixture of pentanols, known as amyl alcohol, derived from fusel oil.

In the process of this invention, a second water removal stage is needed. This is required to remove the water formed in the alkoxylation reaction.

In the process of this invention as amino compound can be used any of the amino compounds generally used, either alone or in admixture, in making resins with formaldehyde. The commonest ones thus are urea and melamine, but others, such as guanidine and thiourea can also be used.

Since the amino compound is added to the process in two parts, this process also affords the possibility of producing resins from two amino compounds, which are added separately and in sequence to the reaction system.

It has also been found that the products of this invention afford resins of better quality, especially in terms of color and clarity, than the products derived from alcoholic formaldehyde solutions.

In the process of this invention, the relative amounts of urea, formaldehyde and alkanol used can vary over a very wide range. The major factor which will determine the ratios taken is the properties desired in the final end product, which is usually a surface coating system. Taking the amino compound, which will usually be either melamine or urea, in step 1 of the process generally from about 4 up to about 10 moles of alkanol are used per mole of amino compound. In sub-steps (a) and (c) of step 1, generally from about 4 to about 10 moles of formaldehyde will be used per mole of amino compound. This ratio is of some importance, since it has to be borne in mind that not all of the amino compound is added at the beginning of the reaction and thus the overall ratio of amino compound to formaldehyde can be different to the ratio chosen for sub-step (a) or (c), depending upon which process is being used. Again taking the amino compound used in sub-step (a) or (c) as the basis, an amount of amino compound will generally be used in sub-steps (b) and (d) which is from about 1.0 up to about 5.0 moles of amino compound per mole used in sub-step (a) or (c). But it is to be emphasized that these indications are not discrete limits outside of which the process of this invention will not work. Rather, they are practical ranges within which it has been found possible to prepare alkoxylated amino resins capable of affording surface coatings with good properties.

Thus with specific reference to sub-steps (a) and (c) four typical intermediate concentrates are as follows:

(i) Aqueous urea-formaldehyde concentrate formed by reacting aqueous formaldehyde with urea, using 4 to 10 moles of formaldehyde per mole of urea, followed by vacuum distillation of some of the water.

(ii) Alkanolic urea-formaldehyde concentrate formed by reacting aqueous formaldehyde, urea, and an alkanol, using 4 to 10 moles of formaldehyde and 4 to 10 moles of alkanol per mole of urea, followed by azeotropic distillation of the water from the mixture.

(iii) Aqueous melamine-formaldehyde concentrate formed by reacting aqueous formaldehyde with melamine, using 4 to 10 moles of formaldehyde per mole of melamine, followed by vacuum distillation of some of the water.

(iv) Alkanolic melamine-formaldehyde concentrate formed by reacting aqueous formaldehyde melamine, and an alkanol, using 4 to 10 moles of formaldehyde and 4 to 10 moles of alkanol per mole of melamine, followed by azeotropic distillation of the water from the mixture.

In the following Examples, reference is made to non-volatiles, or NV, and mineral spirits tolerance, or MST. These are determined as follows.

Non-volatiles: expressed as a percentage, and determined by heating a small weighed sample of about 1 gm for two hours in an oven at 105 C.

Mineral Spirits Tolerance: 10 gm of resin is placed in a container and stirred at 25 C.; mineral spirits is then added from a burette until the resin becomes hazy: the tolerance is then expressed as a wt percentage calculated from the volume added.

EXAMPLE 1

Load 1,050 g 50% aqueous formaldehyde, 1,192 g. n-butanol and 210 g. urea into a reaction vessel; adjust pH to 5.5–6.0 (if necessary). Heat to azeotropically distill off 525 g. water, then cool to room temperature to obtain 1,927 g. butanolic urea-formaldehyde concentrate.

To 1,000 g. of the above butanolic UF concentrate add 209 g. urea and acidify to pH 4.0, using phosphoric or formic acids for example. Heat to reflux, then azeotropically remove 208 g. water of reaction. Vacuum distill off 192 g. n-butanol then cool and neutralize with amine. The resultant butoxylated urea-formaldehyde resin has 67.4% NV, viscosity T-U (Gardner-Holdt) and mineral spirits tolerance of 510% (w/w).

EXAMPLE 2

Load 1,200 g. 50% aqueous formaldehyde, 1,446 g. n-butanol and 273 g. melamine into a reaction vessel. Heat to azeotropically distill off 600 g. water, then cool to room temperature to obtain 2,319 g. butanolic melamine-formaldehyde.

To 1000 g. of the above butanolic MF concentrate add 40 g. melamine and acidify to pH 4.0. Heat to reflux, then azeotropically remove 96 g. water of reaction. Vacuum distill off 266 g. n-butanol, cool, add 45 g. xylol and neutralize with amine. The resultant butoxylated melamine-formaldehyde resin has 70% NV, viscosity R (Gardner-Holdt) and mineral spirits tolerance of greater than 5000% (w/w).

EXAMPLE 3

Load 2,000 g. 50% aqueous formaldehyde and 445 g. urea to a reaction flask and adjust pH to 8.0–8.5, for example with diethanolamine. Heat to 80 C. and hold for one hour. Maintain pH above 7.2. Cool to 50 C. apply vacuum and remove 460 g. water maintaining pH above 7.8. Cool to room temperature to obtain 1,985 g. aqueous urea formaldehyde concentrate containing 28% water, 22% urea and 50% formaldehyde.

To 1000 g. of the above aqueous UF concentrate add 1,138 g. n-butanol and 164 g. urea. Acidify to pH 4.0 for example with formic or phosphoric acid. Heat to reflux, then azeotropically remove 662 g. water. Vacuum distill off 353 g. n-butanol, cool and neutralize with amine. The resultant butoxylated urea-formaldehyde is similar in properties to that obtained in Example 1.

EXAMPLE 4

Load 2,000 g. 50% aqueous formaldehyde and 454 g. melamine to a reaction flask and adjust pH to 8.0 to 8.5 for example with triethanolamine, NaOH, etc. Heat to 70 C. and hold for one hour, maintaining pH above 7.2. Cool to 50 C., apply vacuum and remove 460 g. water, maintaining pH above 7.8. Cool to room temperature to obtain 1994 g. aqueous melamine-formaldehyde concentrate containing 28% water, 23% melamine and 49% formaldehyde.

To 1,000 g. of the above aqueous MF concentrate add 1205 g. n-butanol and 75 g. melamine. Acidify to pH 4.0 for example with formic or phosphoric acid. Heat to reflux, then azeotropically remove 360 g. water. Vacuum distill off 514 g. butanol, cool, add 87 g. xylol and neutralize with amine. The resultant butoxylated melamine-formaldehyde resin is similar in properties to that obtained in Example 2.

EXAMPLE 5

To 1,250 g. aq. uf concentrate from eg. 3 add 775 g. methanol and 222 g. urea. Heat to reflux, then acidify to pH 4.0 with phosphoric acid. Hold at reflux for 90 minutes then neutralize to pH 7.0 with triethylamine. Start distilling off water and methanol while feeding in methanol to replace that lost through distillation. Terminate distillation when 1800 g. distillate has been removed (600 g. methanol was added during the course of the distillation). The resultant product is infinitely soluble in both methanol and water.

What we claim as our invention is:

1. A process for the preparation of an alkoxylated amino resin comprising:
   (1) preparing an aqueous-alkanolic solution of an alkoxylated amino resin by either:

(a) converting an aqueous formaldehyde solution into an alcoholic formaldehyde-amino compound concentrate by admixing an amino compound chosen from the group consisting of urea, thiourea, guanidine, and melamine, and an alkanol, and removing the water by azeotropic distillation, the alkanol having up to 8 carbon atoms inclusive and (b) reacting the thus formed formaldehyde-amino compound concentrate with an amino compound chosen from the group consisting of urea, thiourea, guanidine, and melamine, to provide an alkoxylated amino resin;

or:

(c) converting an aqueous formaldehyde solution into a formaldehyde-amino compound concentrate by admixing aqueous formaldehyde and an amino compound chosen from the group consisting of urea, thiourea, guanidine, and melamine and removing the water by distillation; and (d) reacting the thus formed formaldehyde-amino compound concentrate with an amino compound chosen from the group consisting of urea, thiourea, guanidine, and melamine and an alkanol having up to 8 carbon atoms to provide an alkoxylated amino resin;

(2) removing the water remaining in the alkoxylated amino resin by azeotropic distillation with the alkanol; and
   (3) removing excess remaining alkanol by distillation to provide a desired resin solids content.

2. A process for the preparation of an alkoxylated amino resin comprising:
   (1)
   (i) converting an aqueous formaldehyde solution into an alcoholic formaldehyde-amino compound concentrate by admixing an amino compound chosen from the group consisting of urea, thiourea, guanidine, and melamine and an alkanol, and removing the water by azeotropic distillation, the alkanol having up to 8 carbon atoms inclusive and
   (ii) reacting the thus formed formaldehyde-amino compound concentrate with an amino compound chosen from the group consisting of urea, thiourea, guanidine, and melamine to provide an alkoxylated amino resin;
   (2) removing the water remaining in the alkoxylated amino resin by azetropic distillation with the alkanol; and
   (3) removing excess remaining alkanol by distillation to provide a desired resin solids content.

3. A process for the preparation of an alkoxylated amino resin comprising:
   (1)
   (A) converting an aqueous formaldehyde solution into a formaldehyde-amino compound concentrate by admixing aqueous formaldehyde and an amino compound chosen from the group consisting of urea, thiourea, guanidine, and melamine and removing the water by distillation; and
   (B) reacting the thus formed formaldehyde-amino compound concentrate with an amino compound chosen from the group consisting of urea, thiourea, guanidine, and melamine and an alkanol having up to 8 carbon atoms and which forms two phases with water to provide an alkoxylated amino resin;
   (2) removing the water remaining in the alkoxylated amino resin by azeotropic distillation with the alkanol; and
   (3) removing excess remaining alkanol by distillation to provide a desired resin solids content.

4. A process according to claim 1, 2 or 3 wherein the amino compound is chosen from urea and melamine.

5. A process according to claim 1, 2 or 3 wherein the amino compound is urea.

6. A process according to claim 1, 2 or 3 wherein the amino compound is melamine.

7. A process according to claim 1, 2 or 3 wherein the alkanol forms two phases with water, and during the distillation steps alkanol is separated and continuously returned to the reactor.

8. A process according to claim 1, 2 or 3 wherein the alkanol is n-butanol.

9. A process according to claim 1, 2 or 3 wherein the alkanol is methanol.

10. A process according to claim 1, 2 or 3 wherein the amino compound is urea, and the alkanol is butanol.

11. A process according to claim 1, 2 or 3 wherein the amino compound is urea, and the alkanol is methanol.

12. A process according to claim 1, 2 or 3 wherein the amino compound is melamine, and the alkanol is butanol.

13. A process according to claim 1, 2 or 3 wherein two different amino compounds are used, the first being used to prepare the formaldehyde-amino compound concentrate, and the second being reacted with the formaldehyde amino compound concentrate.

* * * * *